United States Patent
Lin (10) Patent No.: US 11,335,512 B2
(45) Date of Patent: May 17, 2022

(54) CAPACITOR ASSEMBLY STRUCTURE AND METHOD OF MANUFACTURING THE SAME

(71) Applicant: APAQ TECHNOLOGY CO., LTD., Miaoli County (TW)

(72) Inventor: Chieh Lin, Hsinchu County (TW)

(73) Assignee: APAQ TECHNOLOGY CO., LTD., Miaoli County (TW)

(*) Notice: Subject to any disclaimer, the term of this patent is extended or adjusted under 35 U.S.C. 154(b) by 0 days.

(21) Appl. No.: 16/920,803

(22) Filed: Jul. 6, 2020

(65) Prior Publication Data

US 2021/0175023 A1 Jun. 10, 2021

(30) Foreign Application Priority Data

Dec. 4, 2019 (TW) ................................. 108144291

(51) Int. Cl.
| | |
|---|---|
| *H01G 9/048* | (2006.01) |
| *H01G 9/042* | (2006.01) |
| *H01G 4/002* | (2006.01) |
| *H01G 9/08* | (2006.01) |
| *H01G 4/38* | (2006.01) |
| *H01G 9/15* | (2006.01) |

(52) U.S. Cl.
CPC ............. *H01G 9/048* (2013.01); *H01G 4/002* (2013.01); *H01G 4/38* (2013.01); *H01G 9/042* (2013.01); *H01G 9/08* (2013.01); *H01G 9/15* (2013.01)

(58) Field of Classification Search
CPC .................. H01G 9/15; H01G 9/012
USPC .......................................................... 361/541
See application file for complete search history.

(56) References Cited

U.S. PATENT DOCUMENTS

| | | | | |
|---|---|---|---|---|
| 2002/0001169 | A1* | 1/2002 | Shiraishi | H01G 9/012 361/523 |
| 2004/0264111 | A1* | 12/2004 | Shimoyama | H01G 9/012 361/523 |
| 2019/0228916 | A1* | 7/2019 | Aritomi | H01G 9/15 |
| 2020/0194187 | A1* | 6/2020 | Kumakawa | H01G 9/04 |
| 2020/0211784 | A1* | 7/2020 | Tamatani | H01G 9/045 |
| 2020/0266005 | A1* | 8/2020 | Suzuki | H01G 9/08 |
| 2020/0273628 | A1* | 8/2020 | Suzuki | H01G 9/15 |
| 2020/0335284 | A1* | 10/2020 | Yamazaki | H01G 9/14 |

* cited by examiner

*Primary Examiner* — Eric W Thomas
(74) *Attorney, Agent, or Firm* — L & Cai Intellectual Property (USA) Office (57) ABSTRACT

A capacitor assembly structure and a method of manufacturing the same are provided. The capacitor assembly structure includes a capacitor unit, an insulative package body, a plurality of positive composite material layers, a conductive connection layer and an electrode unit. The capacitor unit includes a plurality of capacitors each having a positive portion and a negative portion. The insulative package body partially covers the capacitors. A lateral side of the positive portion is exposed from a first lateral surface of the insulative package body. Each positive composite material layer is disposed on the first lateral surface and the lateral side so as to electrically connect to the positive portion. The conductive connection layer is electrically connected to the negative portion. The electrode unit includes a first electrode structure electrically contacting the positive composite material layer and a second electrode structure electrically contacting the conductive connection layer.

5 Claims, 12 Drawing Sheets

CAPACITOR ASSEMBLY STRUCTURE AND METHOD OF MANUFACTURING THE SAME

CROSS-REFERENCE TO RELATED PATENT APPLICATION

This application claims the benefit of priority to Taiwan Patent Application No. 108144291, filed on Dec. 4, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an assembly structure and a method of manufacturing the same, and more particularly to a capacitor assembly structure and a method of manufacturing the same.

BACKGROUND OF THE DISCLOSURE

Various applications of capacitors include being used in home appliances, computer motherboards and peripherals, power supplies, communication products and automobiles. Capacitors such as solid electrolytic capacitors are mainly used to provide filtering, bypassing, rectifying, coupling, blocking or transforming function. Because the solid electrolytic capacitor has the advantages of small size, large electrical capacity and good frequency characteristic, it can be used as a decoupling element in the power circuit of a central processing unit (CPU). In general, a plurality of capacitor elements is stacked together to form a stacked solid electrolytic capacitor with a high electrical capacity. In addition, the stacked solid electrolytic capacitor of the related art includes a plurality of capacitor elements and a lead frame. Each of the capacitor elements includes an anode part, a cathode part and an insulating part. The insulating part is insulated from the anode part and the cathode part. More specifically, the cathode parts of the capacitor elements are stacked on top of one another.

SUMMARY OF THE DISCLOSURE

In response to the above-referenced technical inadequacies, the present disclosure provides a capacitor assembly structure and a method of manufacturing the same.

In one aspect, the present disclosure provides a capacitor assembly structure, including a capacitor unit, an insulative package body, a plurality of positive composite material layers, a conductive connection layer and an electrode unit. The capacitor unit includes a plurality of capacitors, and each capacitor has a positive portion and a negative portion. The insulative package body partially covers the capacitors, and a lateral side of the positive portion of each capacitor is exposed from a first lateral surface of the insulative package body. The positive composite material layers are respectively electrically connected to the capacitors, and each positive composite material layer is disposed on the first lateral surface of the insulative package body and the lateral side of the positive portion of the corresponding capacitor so as to electrically connect to the positive portion of the corresponding capacitor. The conductive connection layer is electrically connected to the negative portion of the capacitor. The electrode unit includes a first electrode structure and a second electrode structure. The first electrode structure covers a first portion of the insulative package body and electrically contacts the positive composite material layer, and the second electrode structure covers a second portion of the insulative package body and electrically contacts the conductive connection layer.

In another aspect, the present disclosure provides a capacitor assembly structure, including: a capacitor, an insulative package body, a positive composite material layer, a conductive connection layer, and an electrode unit. The capacitor has a positive portion and a negative portion. The insulative package body partially covers the capacitor, and a lateral side of the positive portion of the capacitor is exposed from a first lateral surface of the insulative package body. The positive composite material layer is disposed on the first lateral surface of the insulative package body and the lateral side of the positive portion of the capacitor so as to electrically connect to the positive portion of the capacitor. The conductive connection layer is electrically connected to the negative portion of the capacitor. The electrode unit includes a first electrode structure and a second electrode structure. The first electrode structure covers a first portion of the insulative package body and electrically contacts the positive composite material layer, and the second electrode structure covers a second portion of the insulative package body and electrically contacts the conductive connection layer.

In yet another aspect, the present disclosure provides a method of manufacturing a capacitor assembly structure, including: providing at least one capacitor having a positive portion and a negative portion; placing the at least one capacitor on a conductive connection layer so as to electrically connect the conductive connection layer with the negative portion of the at least one capacitor; totally covering the at least one capacitor by an insulative package body; cutting the insulative package body so as to expose a lateral side of the positive portion of the at least one capacitor from a first lateral surface of the insulative package body; forming at least one positive composite material layer on the first lateral surface of the insulative package body and the lateral side of the positive portion of the at least one capacitor so as to electrically connect the positive composite material layer to the positive portion of the at least one capacitor; and forming an electrode unit including a first electrode structure and a second electrode structure, the first electrode structure covering a first portion of the insulative package body and electrically contacting the positive composite material layer, the second electrode structure covering a second portion of the insulative package body and electrically contacting the conductive connection layer.

Therefore, by virtue of "the capacitor unit including a plurality of capacitors, and each capacitor having a positive portion and a negative portion", "the insulative package body partially covering the capacitors, and a lateral side of the positive portion of each capacitor being exposed from a first lateral surface of the insulative package body", "the positive composite material layers being respectively electrically connected to the capacitors, and each positive composite material layer being disposed on the first lateral surface of the insulative package body and the lateral side of the positive portion of the corresponding capacitor so as to electrically connect to the positive portion of the corresponding capacitor", "the conductive connection layer being electrically connected to the negative portion of the capacitor", and "the electrode unit including a first electrode structure and a second electrode structure, the first electrode structure covering a first portion of the insulative package body and electrically contacting the positive composite material layer, and the second electrode structure covering a second portion of the insulative package body and electrically contacting the conductive connection layer", the production efficiency of the capacitor assembly structure is increased effectively.

Furthermore, by virtue of "providing at least one capacitor having a positive portion and a negative portion", "placing the at least one capacitor on a conductive connection layer so as to electrically connect the conductive connection layer with the negative portion of the at least one capacitor", "totally covering the at least one capacitor by an insulative package body", "cutting the insulative package body so as to expose a lateral side of the positive portion of the at least one capacitor from a first lateral surface of the insulative package body", "forming at least one positive composite material layer on the first lateral surface of the insulative package body and the lateral side of the positive portion of the at least one capacitor so as to electrically connect the positive composite material layer to the positive portion of the at least one capacitor", and "forming an electrode unit including a first electrode structure and a second electrode structure, the first electrode structure covering a first portion of the insulative package body and electrically contacting the positive composite material layer, and the second electrode structure covering a second portion of the insulative package body and electrically contacting the conductive connection layer", the production efficiency of the capacitor assembly structure is increased effectively.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIRST EMBODIMENT

Figure 1:
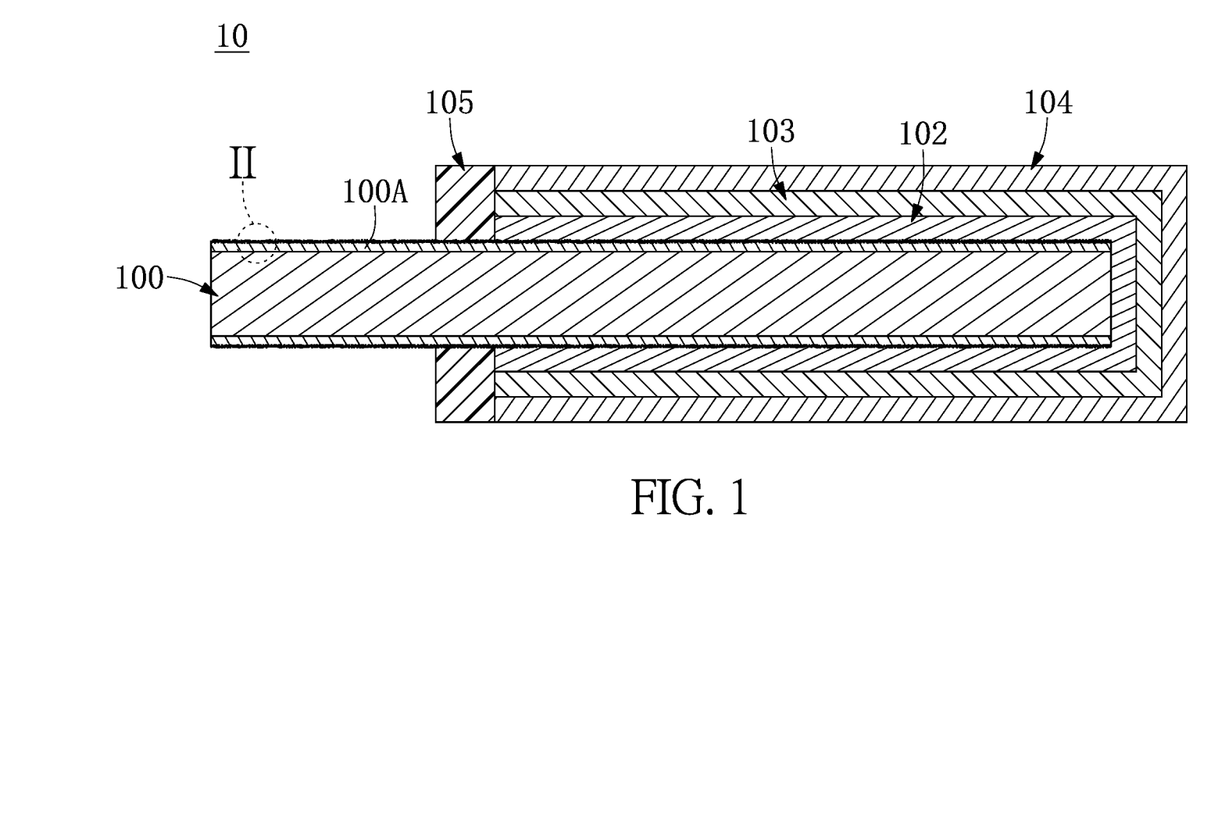
FIG. 1 is a cross-sectional, schematic view of a capacitor according to a first embodiment of the present disclosure.
Figure 2:
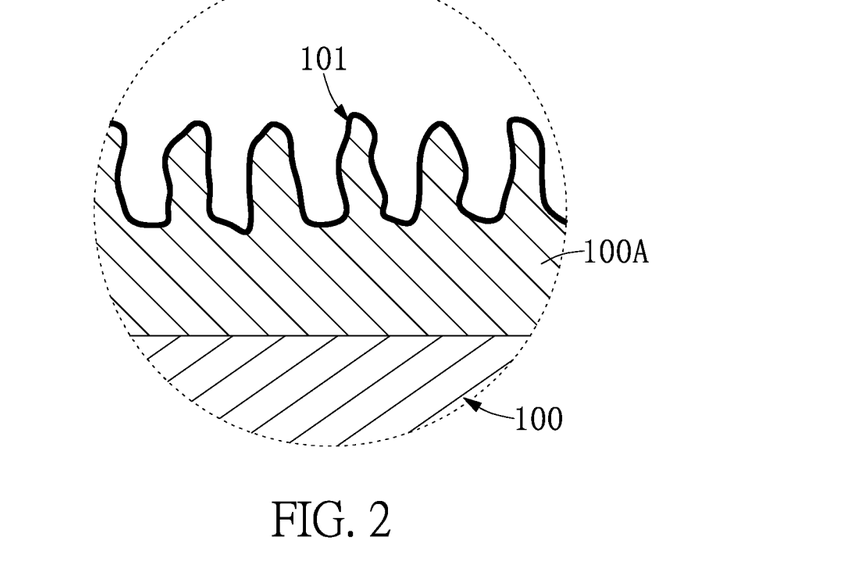
FIG. 2 shows an enlarged view of part II of FIG. 1.
Figure 3:
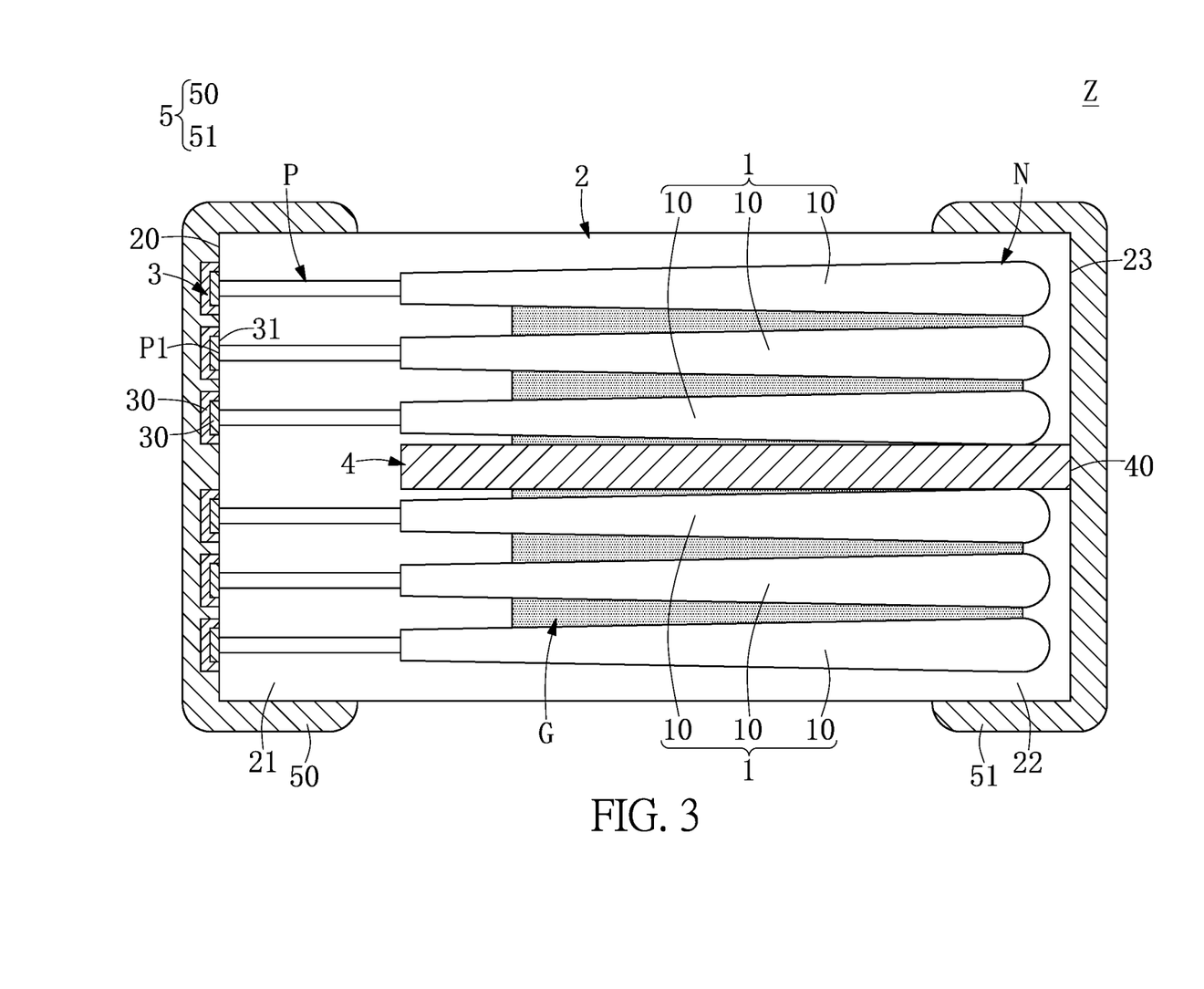
FIG. 3 is a cross-sectional, schematic view of a capacitor assembly structure according to the first embodiment of the present disclosure.

Referring to FIG. 1 to FIG. 3, a first embodiment of the present disclosure provides a capacitor assembly structure Z, including a capacitor unit 1, an insulative package body 2, a plurality of positive composite material layers 3, a conductive connection layer 4 and an electrode unit 5. For example, the capacitor assembly structure Z may be a solid electrolytic capacitor package structure, but it is merely an example and is not meant to limit the present disclosure.

More particularly, the capacitor unit 1 may includes a plurality of capacitors 10, and each capacitor 10 has a positive portion P and a negative portion N. The capacitors 10 can be stacked on top of one another, every two capacitors 10 can be electrically connected with each other via a conductive glue, and the positive portions P of the capacitors 10 are separated from each other. For example, as shown in FIG. 1 and FIG. 2, each capacitor 10 may include a metal foil 100, an oxidation layer 101 for fully enclosing the metal foil 100, a conductive polymer layer 102 for enclosing a portion of the oxidation layer 101, a carbon paste layer 103 for fully enclosing the conductive polymer layer 102, and a silver paste layer 104 for fully enclosing the carbon paste layer 103. The oxidation layer 101 is formed on an outer surface of the metal foil 100 so as to fully enclose the metal foil 100. The metal foil 100 may be made of Al, Cu or any metal material according to different requirements. The metal foil 100 has a porous corrosion layer 100A formed on a surface thereof, so that the metal foil 100 may be a corrosion foil having the porous corrosion layer 100A. In addition, as shown in FIG. 2, when the metal foil 100 is oxidized, the oxidation layer 101 is formed on the outer surface of the metal foil 100, and the metal foil 100 with the oxidation layer 101 can be referred to as a valve metal foil.

More particularly, referring to FIG. 1 and FIG. 2, each of the capacitors 10 has a surrounding insulative layer 105 disposed on the outer surface of the oxidation layer 101 and around the oxidation layer 101, and the lengths of the conductive polymer layer 102, the carbon paste layer 103 and the silver paste layer 104 of the capacitor 10 are limited or restricted by the surrounding insulative layer 105. For example, the surrounding insulative layer 105 of the capacitor 10 is surroundingly disposed on the oxidation layer 101 for contacting an end of the conductive polymer layer 102, an end of the carbon paste layer 103 and an end of the silver paste layer 104. However, the aforementioned description for the capacitor 10 is merely an example and is not meant to limit the present disclosure.

Moreover, as shown in FIG. 3, the insulative package body 2 can partially cover the capacitors 10, and a lateral side P1 of the positive portion P of each capacitor 10 can be exposed from a first lateral surface 20 of the insulative package body 2. For example, the first lateral surface 20 of the insulative package body 2 can be substantially flush with the lateral side P1 of the positive portion P of the capacitor 1, and the insulative package body 2 may be made of any insulative material such as epoxy or silicon. However, the aforementioned description for the insulative package body 2 is merely an example and is not meant to limit the present disclosure.

Furthermore, the positive composite material layers 3 are respectively electrically connected to the capacitors 1. Each positive composite material layer 3 is disposed on the first lateral surface 20 of the insulative package body 2 and the lateral side P1 of the positive portion P of the corresponding capacitor 1 so as to electrically connect to the positive portion P of the corresponding capacitor 1. For example, as shown in FIG. 3, the positive composite material layer 3 may include at least two positive conductive layers 30 that are sequentially stacked (or are stacked on top of one another) on the first lateral surface 20 of the insulative package body 2 to cover the lateral side P1 of the positive portion P of the corresponding capacitor 1, and one of the at least two positive conductive layers 30 electrically contacts the positive portion P of the corresponding capacitor 1. In addition, the positive composite material layer 3 has a plane 31 contacting the first lateral surface 20 of the insulative package body 2 and the lateral side P1 of the positive portion P. In other words, the plane 31 of each of the positive conductive layers 30 can contact both the first lateral surface 20 of the insulative package body 2 and the lateral side P1 of the positive portion P. In addition, the positive conductive layer 30 may be an Ni layer that is made of Ni, an Ag layer that is made of Ag, a Cu layer that is made of Cu, a Cr layer that is made of Cr, an Sn layer that is made of Sn, a Zn layer that is made of Zn, an Au layer that is made of Au, a Pt layer that is made of Pt, a Pd layer that is made of Pd, or a Ti layer that is made of Ti. However, the aforementioned description for the positive conductive layer 30 is merely an example and is not meant to limit the present disclosure.

In addition, the conductive connection layer 4 is electrically connected to the negative portion N of the capacitor 10. For example, as shown in FIG. 3, the conductive connection layer 4 is disposed and electrically connected between two adjacent capacitors 10. The insulative package body 2 has a second lateral surface 23 that is flush with a lateral side 40 of the conductive connection layer 4. The conductive connection layer 4 can be made of any conductive material. However, the aforementioned description for the conductive connection layer 4 is merely an example and is not meant to limit the present disclosure.

Moreover, as shown in FIG. 3, the electrode unit 5 includes a first electrode structure 50 and a second electrode structure 51. The first electrode structure 50 can cover (or enclose) a first portion 21 of the insulative package body 2 and electrically contact the positive composite material layer 3, and the second electrode structure 51 can cover (or enclose) a second portion 22 of the insulative package body 2 and electrically contact the conductive connection layer 4. More particularly, the first electrode structure 50 can be used as a first external electrode for covering (or enclosing) the first portion 21 of the insulative package body 2 and electrically contacting the positive composite material layer 3, and the second electrode structure 51 can be used as a second external electrode for covering (or enclosing) the second portion 22 of the insulative package body 2 and electrically contacting the conductive connection layer 4. In other words, one part of the insulative package body 2 can be covered (or enclosed) by a first external electrode such as the first electrode structure 50 that is electrically connected to the positive composite material layer 3, and another part of the insulative package body 2 can be covered (or enclosed) by a second external electrode such as the second electrode structure 51 that is electrically connected to the conductive connection layer 4. However, the aforementioned description for the electrode unit 5 is merely an example and is not meant to limit the present disclosure.

Therefore, the lateral side P1 of the positive portion P of each capacitor 10 can be exposed from the first lateral surface 20 of the insulative package body 2, and each positive composite material layer 3 is disposed on the first lateral surface 20 of the insulative package body 2 and the lateral side P1 of the positive portion P of the corresponding capacitor 10 so as to electrically connect to the positive portion P of the corresponding capacitor 10, so that the manufacturing process of the capacitor assembly structure Z can be reduced so as to effectively increase the production efficiency of the capacitor assembly structure Z.

SECOND EMBODIMENT

Figure 4:
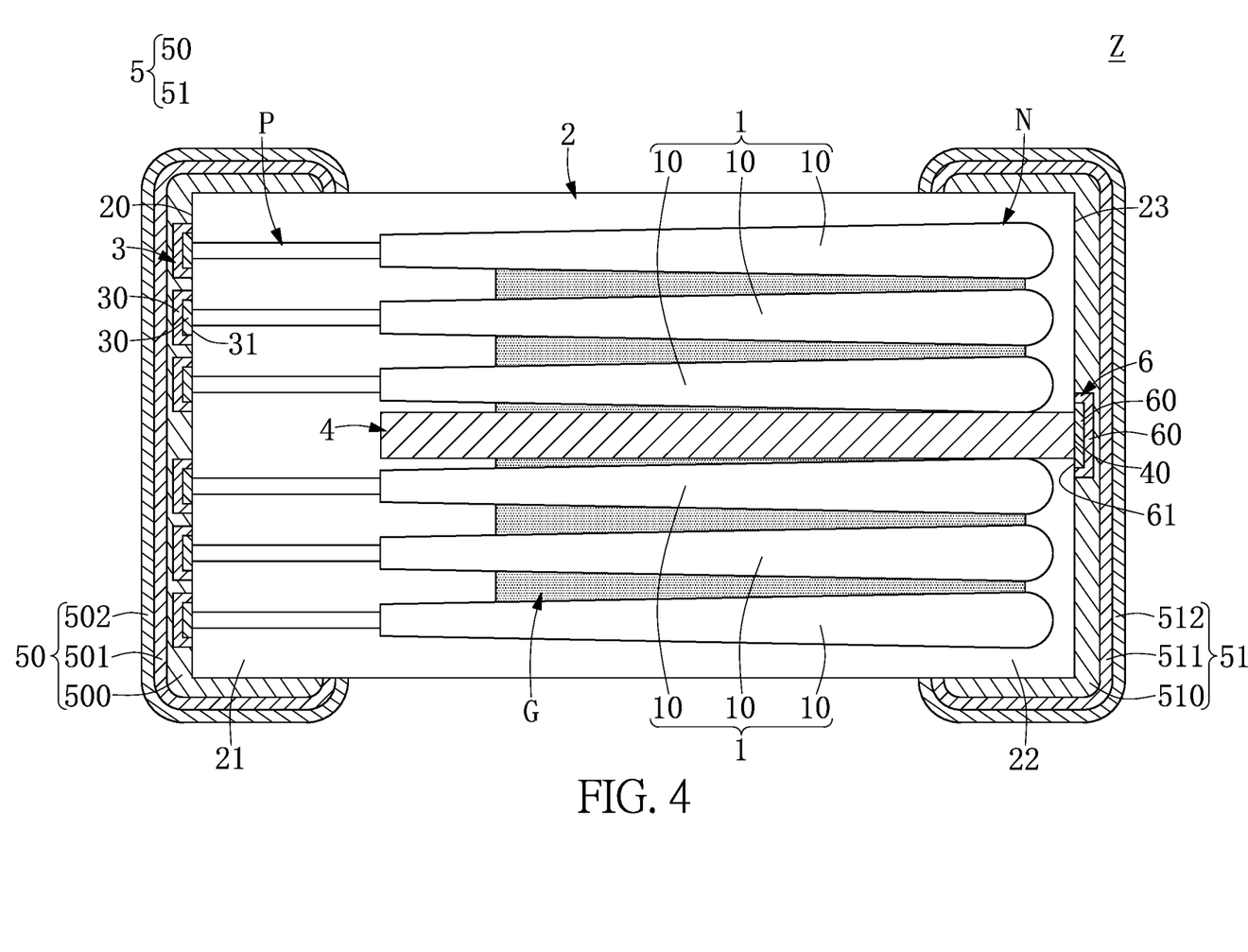
FIG. 4 is a cross-sectional, schematic view of a capacitor assembly structure according to a second embodiment of the present disclosure.

Referring to FIG. 4, a second embodiment of the present disclosure provides a capacitor assembly structure Z, including a capacitor unit 1, an insulative package body 2, a plurality of positive composite material layers 3, a conductive connection layer 4 and an electrode unit 5. Comparing FIG. 4 with FIG. 3, the difference between the second embodiment and the first embodiment is as follows: in the second embodiment, the first electrode structure 50 includes a first inner conductive layer 500 for covering (or enclosing) the first portion 21 of the insulative package body 2 and electrically connecting to the positive composite material layer 3, a first middle conductive layer 501 for covering (or enclosing) the first inner conductive layer 500, and a first outer conductive layer 502 for covering (or enclosing) the first middle conductive layer 501. In addition, the second electrode structure 51 includes a second inner conductive layer 510 for covering (or enclosing) the second portion 22 of the insulative package body 2 and electrically connecting to the conductive connection layer 4, a second middle conductive layer 511 for covering (or enclosing) the second inner conductive layer 510, and a second outer conductive layer 512 for covering (or enclosing) the second middle conductive layer 511.

For example, the first inner conductive layer 500, the first middle conductive layer 501 and the first outer conductive layer 502 of the first electrode structure 50 are sequentially stacked on the first portion 21 of the insulative package body 2 so as to cover or enclose the first portion 21 of the insulative package body 2. The second inner conductive layer 510, the second middle conductive layer 511 and the second outer conductive layer 512 of the second electrode structure 51 are sequentially stacked on the second portion 22 of the insulative package body 2 so as to cover or enclose the second portion 22 of the insulative package body 2. In addition, both the first inner conductive layer 500 and the second inner conductive layer 510 may be Ag layers (those are made of Ag or other conductive materials similar to Ag) or composite material layers each including an Ag layer and a conductive diffusion barrier layer. Both the first middle conductive layer 501 and the second middle conductive layer 511 may be Ni layers that are made of Ni (or other conductive materials similar to Ni), and both the first outer conductive layer 502 and the second outer conductive layer 512 may be Sn layers that are made of Sn (or other conductive materials similar to Sn). In addition, the conductive diffusion barrier layer is selected from a combination of carbon (C), carbon compounds, carbon nanotubes, graphene, silver (Ag), gold (Au), platinum (Pt), palladium (Pb), titanium nitride (TiNx), titanium carbide (TiC), and other antioxidant materials, but it is merely an example and is not meant to limit the present disclosure. Therefore, by using the conductive diffusion barrier layer, external moisture cannot pass through the electrode unit 5 and enter the capacitor unit 1, so that airtightness and weather resistance of the capacitor assembly structure Z can be increased.

More particularly, as shown in FIG. 4, the capacitor assembly structure Z further includes a negative composite material layer 6 disposed on a second lateral surface 23 of the insulative package body 2 and a lateral side 40 of the conductive connection layer 4 so as to electrically connect to the negative portion N of the capacitor 10. For example, as shown in FIG. 4, the negative composite material layer 6 includes at least two negative conductive layers 60 that are disposed inside the second inner conductive layer 510 and that are sequentially stacked on the second lateral surface 23 of the insulative package body 2 and the lateral side 40 of the conductive connection layer 4. Moreover, the second lateral surface 23 of the insulative package body 2 is substantially flush with the lateral side 40 of the conductive connection layer 4, and the negative composite material layer 6 has a plane 61 contacting the second lateral surface 23 of the insulative package body 2 and the lateral side 40 of the conductive connection layer 4. In addition, the negative conductive layer 60 may be an Ni layer that is made of Ni, an Ag layer that is made of Ag, a Cu layer that is made of Cu, a Cr layer that is made of Cr, an Sn layer that is made of Sn, a Zn layer that is made of Zn, an Au layer that is made of Au, a Pt layer that is made of Pt, a Pd layer that is made of Pd, or a Ti layer that is made of Ti. However, the aforementioned description for the negative composite material layer 6 is merely an example and is not meant to limit the present disclosure.

THIRD EMBODIMENT

Figure 5:
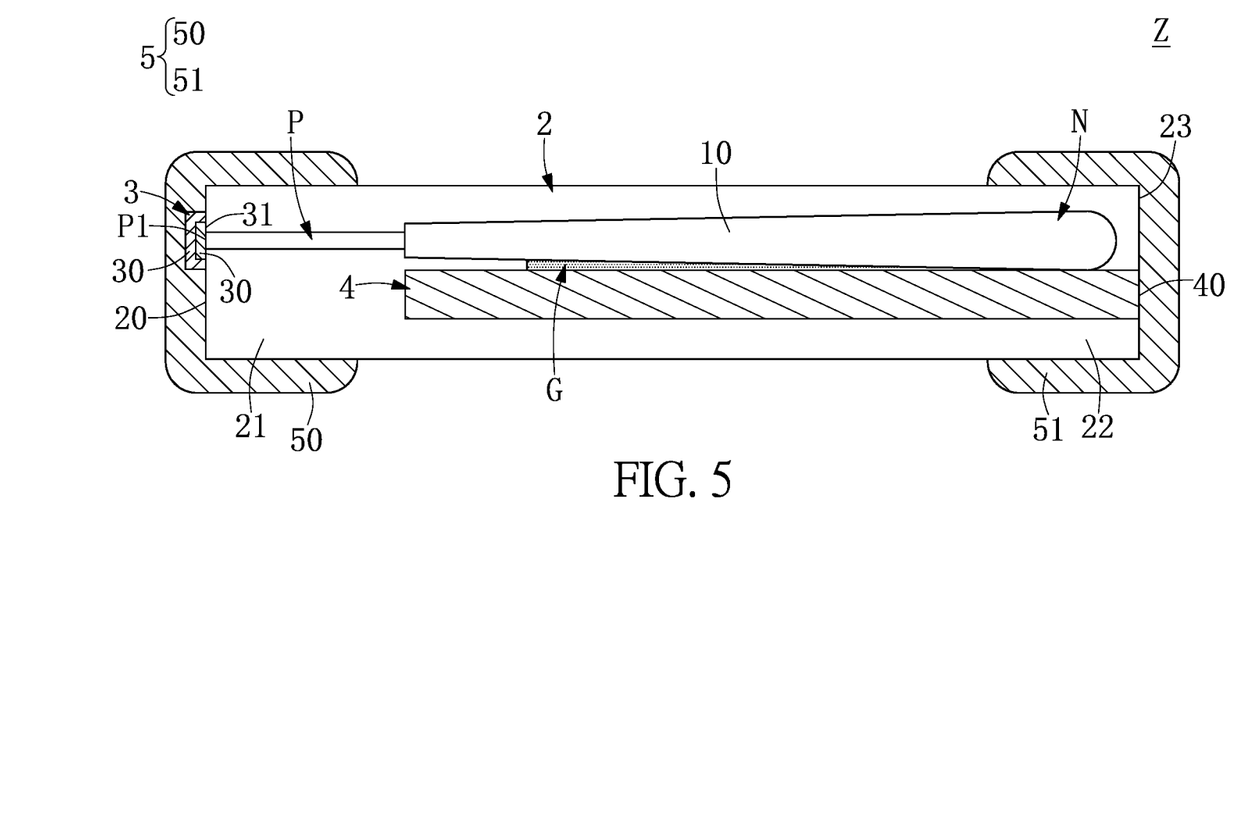
FIG. 5 is a cross-sectional, schematic view of a capacitor assembly structure according to a third embodiment of the present disclosure.
Figure 6:
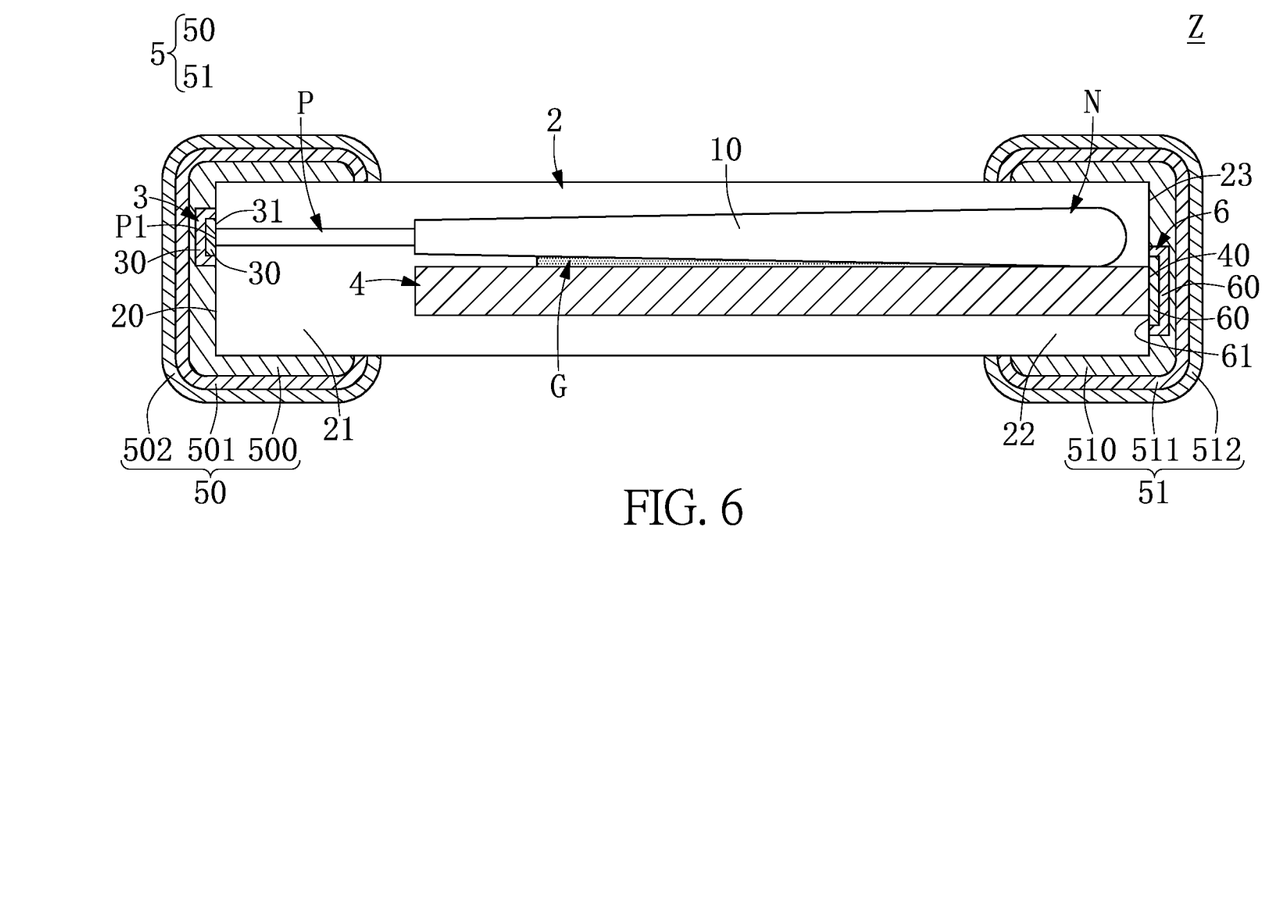
FIG. 6 is another cross-sectional, schematic view of the capacitor assembly structure according to the third embodiment of the present disclosure.

Referring to FIG. 5 and FIG. 6, a third embodiment of the present disclosure provides a capacitor assembly structure Z, including a capacitor 10, an insulative package body 2, a positive composite material layer 3, a conductive connection layer 4 and an electrode unit 5. Comparing FIG. 5 with FIG. 3, the difference between the third embodiment and the first embodiment is as follows: the capacitor assembly structure Z of the third embodiment can use only one capacitor 10 and one positive composite material layer 3.

More particularly, as shown in FIG. 4 and FIG. 6, the electrode unit 5 of the capacitor assembly structure Z of the third embodiment is the same as the first embodiment, that is to say, the first electrode structure 50 includes a first inner conductive layer 500, a first middle conductive layer 501 and a first outer conductive layer 502, and the second electrode structure 51 includes a second inner conductive layer 510, a second middle conductive layer 511 and a second outer conductive layer 512. In addition, the capacitor assembly structure Z further includes a negative composite material layer 6 disposed on a second lateral surface 23 of the insulative package body 2 and a lateral side 40 of the conductive connection layer 4 so as to electrically connect to the negative portion N of the capacitor 10. For example, as shown in FIG. 6, the negative composite material layer 6 includes at least two negative conductive layers 60 that are disposed inside the second inner conductive layer 510 and that are sequentially stacked on the second lateral surface 23 of the insulative package body 2 and the lateral side 40 of the conductive connection layer 4. Moreover, the second lateral surface 23 of the insulative package body 2 is substantially flush with the lateral side 40 of the conductive connection layer 4, and the negative composite material layer 6 has a plane 61 contacting the second lateral surface 23 of the insulative package body 2 and the lateral side 40 of the conductive connection layer 4. In addition, the negative conductive layer 60 may be an Ni layer that is made of Ni, an Ag layer that is made of Ag, a Cu layer that is made of Cu, a Cr layer that is made of Cr, an Sn layer that is made of Sn, a Zn layer that is made of Zn, an Au layer that is made of Au, a Pt layer that is made of Pt, a Pd layer that is made of Pd, or a Ti layer that is made of Ti. However, the aforementioned description for the negative composite material layer 6 is merely an example and is not meant to limit the present disclosure.

FOURTH EMBODIMENT

Figure 7:
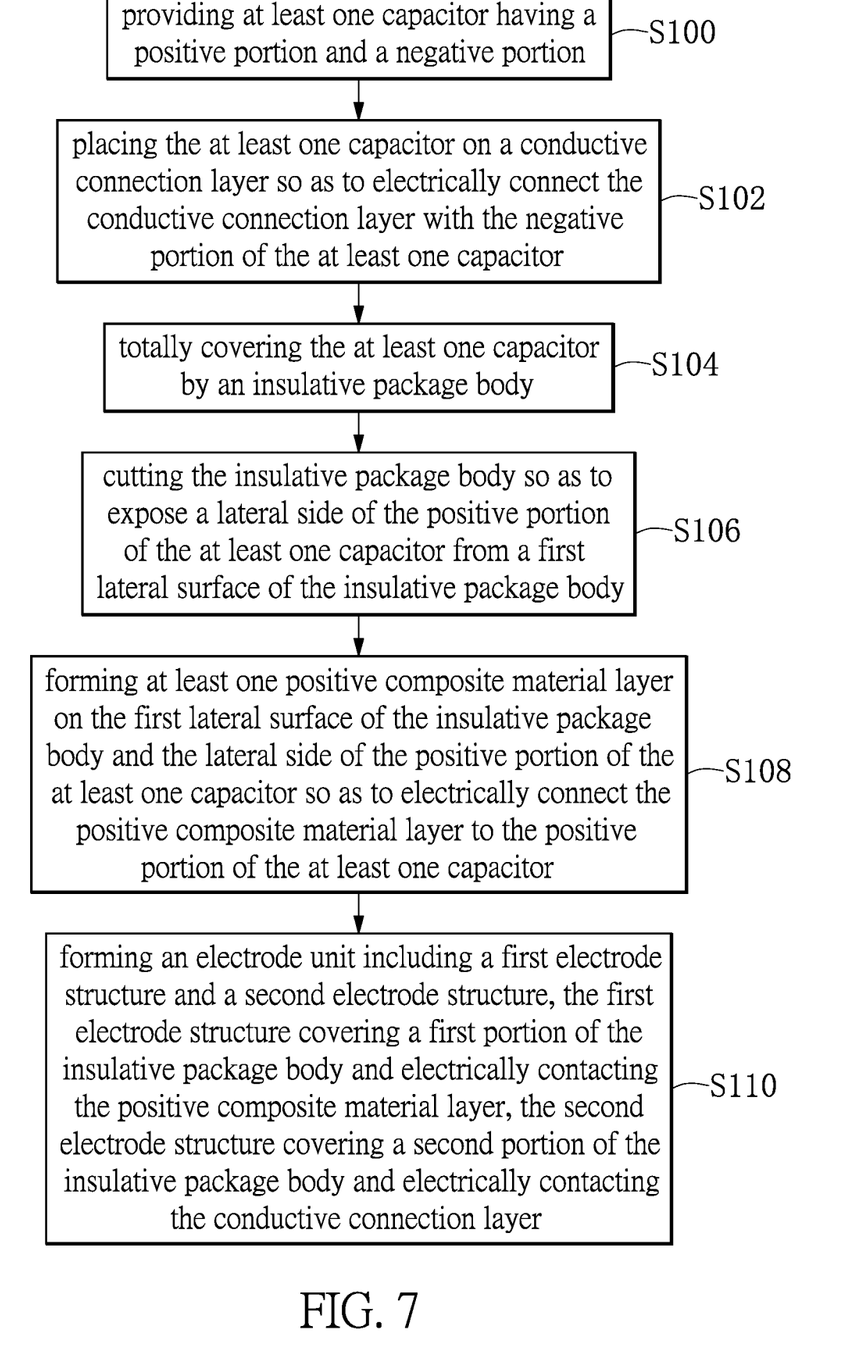
FIG. 7 is a flowchart of a method of manufacturing a capacitor assembly structure according to a fourth embodiment of the present disclosure.
Figure 8:
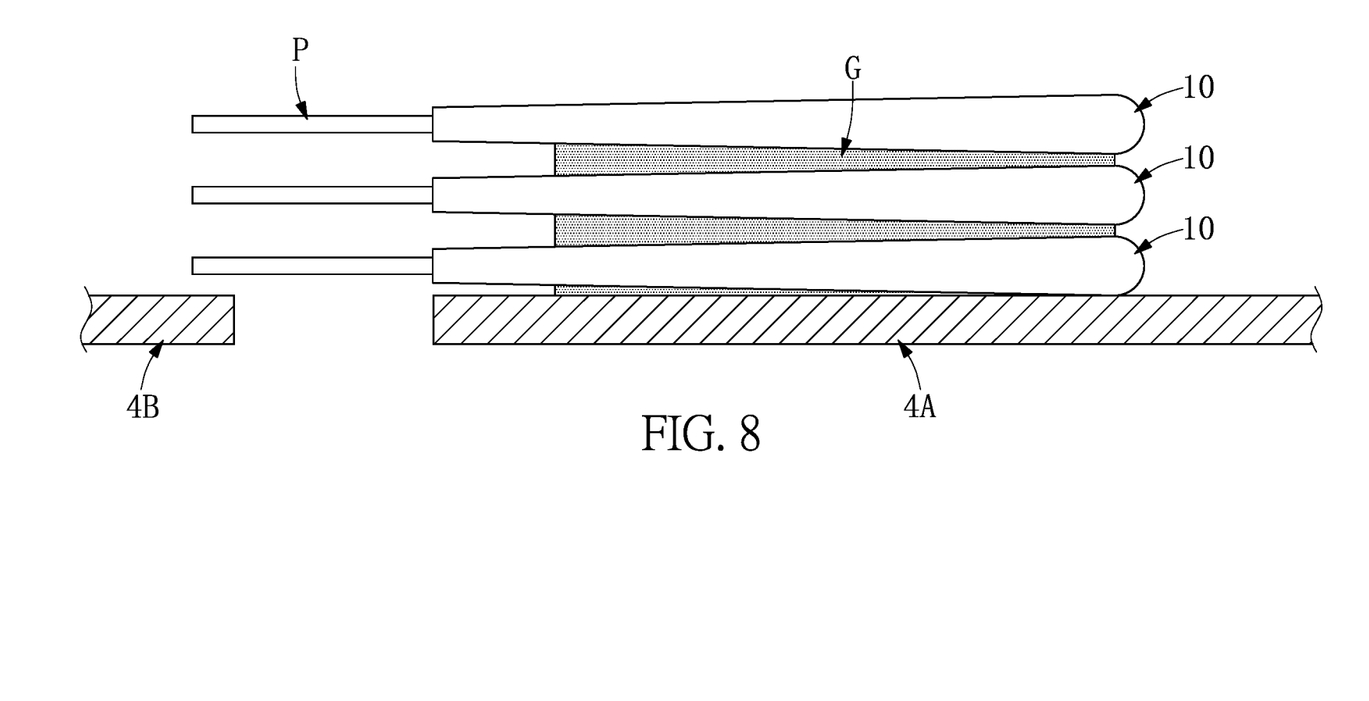
FIG. 8 is a cross-sectional, schematic view of the step S102 of the method of manufacturing the capacitor assembly structure according to the fourth embodiment of the present disclosure.
Figure 12:
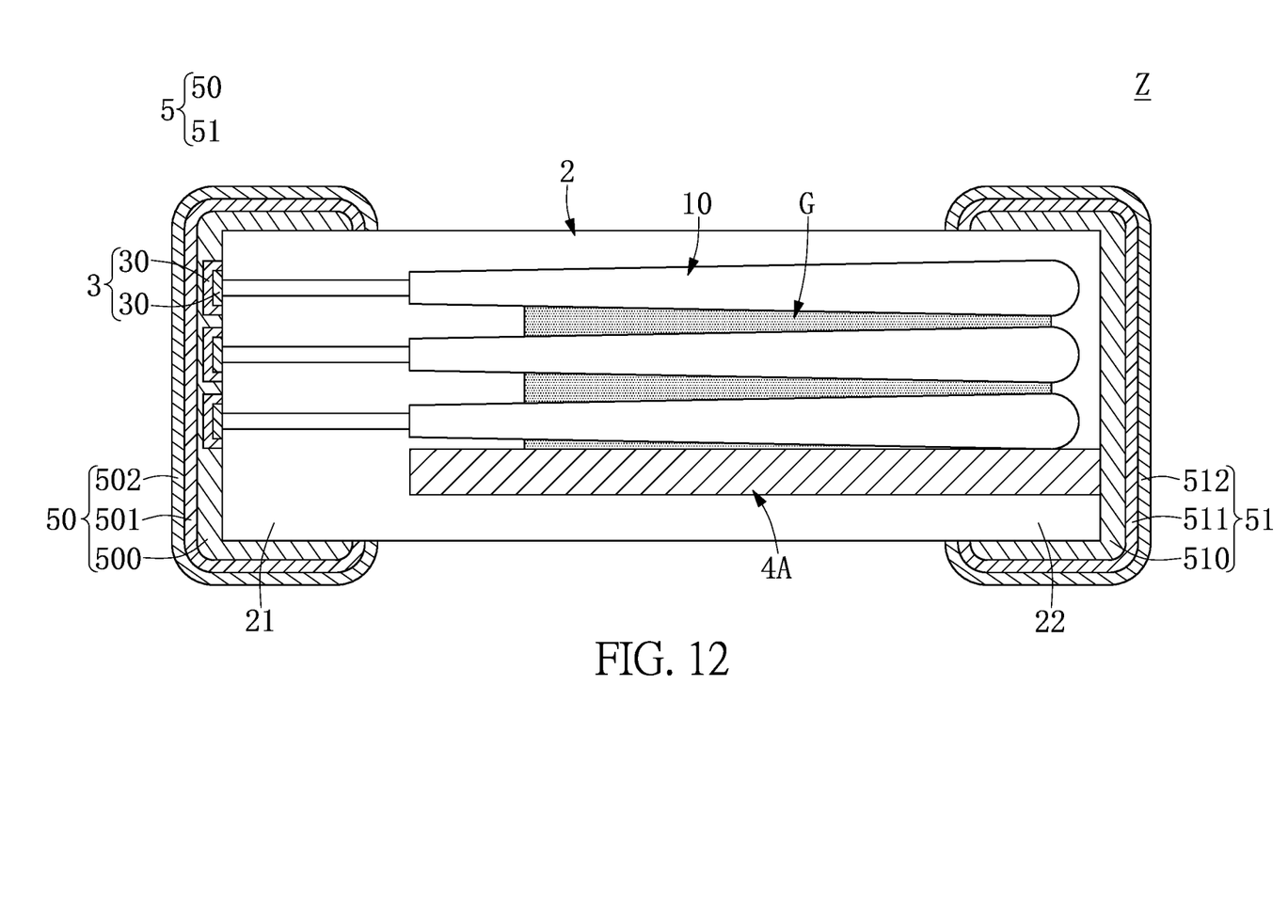
FIG. 12 is a cross-sectional, schematic view of the step S110 of the method of manufacturing the capacitor assembly structure according to the fourth embodiment of the present disclosure.

Referring to FIG. 7 and FIG. 12, a fourth embodiment of the present disclosure provides a method of manufacturing a capacitor assembly structure Z, including the following steps:

First, the step S100 includes providing at least one capacitor 10 having a positive portion P and a negative portion N. For example, referring to FIG. 7 and FIG. 8, the number of the capacitors 10 each having the positive portion P and the negative portion N may be greater than or equal to one, but it is merely an example and is not meant to limit the present disclosure.

Next, the step S102 includes placing the at least one capacitor 10 on a conductive connection layer 4 so as to electrically connect the conductive connection layer 4 with the negative portion N of the at least one capacitor 10. For example, referring to FIG. 7 and FIG. 8, the conductive connection layer 4 includes a first connection layer 4A and a second connection layer 4B, a plurality of capacitors 10 are sequentially stacked on the first connection layer 4A, and the second connection layer 4B can be omitted. In addition, the present disclosure can provide a plurality of conductive connection layers 4 that can be arranged as a matrix, so that the first connection layers 4A and the second connection layers 4B of the conductive connection layers 4 can be arranged in matrix arrangement.

Figure 9:
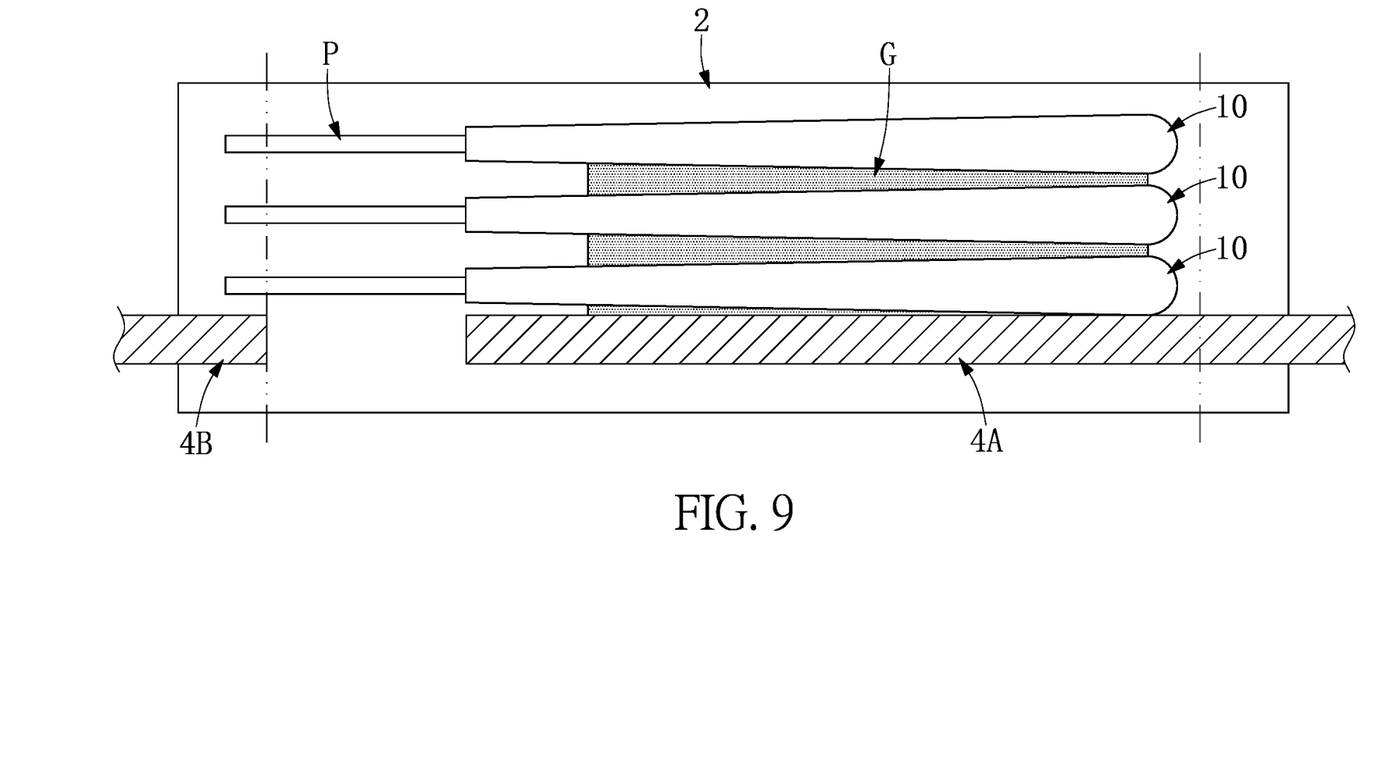
FIG. 9 is a cross-sectional, schematic view of the step S104 of the method of manufacturing the capacitor assembly structure according to the fourth embodiment of the present disclosure.

Afterward, the step S104 includes totally covering the at least one capacitor 10 by an insulative package body 2. For example, referring to FIG. 7 and FIG. 9, the capacitors 10, a part of the first connection layer 4A and a part of the second connection layer 4B can be covered or enclosed by the insulative package body 2.

Figure 10:
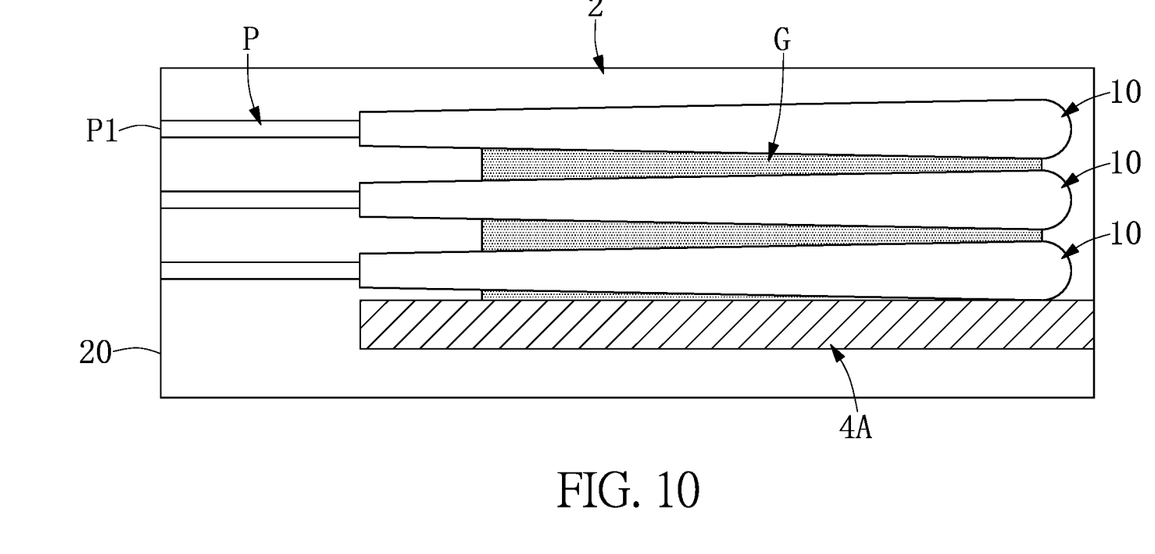
FIG. 10 is a cross-sectional, schematic view of the step S106 of the method of manufacturing the capacitor assembly structure according to the fourth embodiment of the present disclosure.

Thereafter, the step S106 includes cutting the insulative package body 2 so as to expose a lateral side P1 of the positive portion P of the at least one capacitor 10 from a first lateral surface 20 of the insulative package body 2. For example, referring to FIG. 7, FIG. 9 and FIG. 10, after covering or enclosing the capacitors 10, the part of the first connection layer 4A and the part of the second connection layer 4B by the insulative package body 2, the lateral side P1 of the positive portion P of the at least one capacitor 10 is exposed from the first lateral surface 20 of the insulative package body 2 by cutting of the insulative package body 2.

Figure 11:
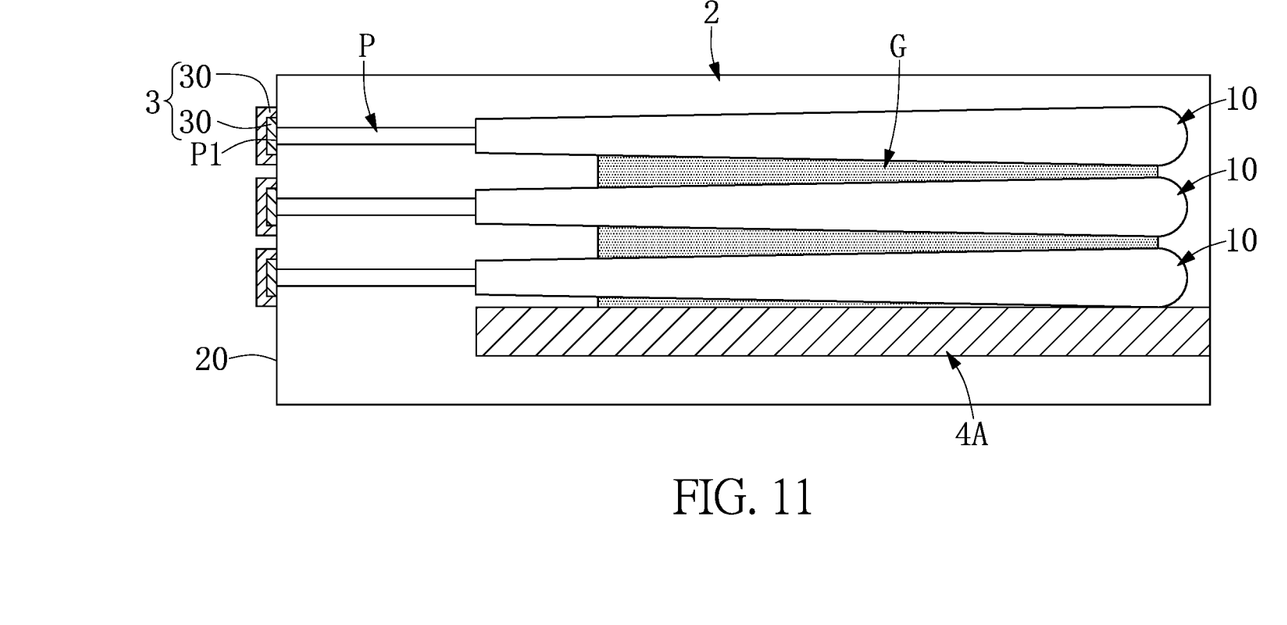
FIG. 11 is a cross-sectional, schematic view of the step S108 of the method of manufacturing the capacitor assembly structure according to the fourth embodiment of the present disclosure.

Subsequently, the step S108 includes forming at least one positive composite material layer 3 on the first lateral surface 20 of the insulative package body 2 and the lateral side P1 of the positive portion P of the at least one capacitor 10 so as to electrically connect the positive composite material layer 3 to the positive portion P of the at least one capacitor 10. For example, referring to FIG. 7 and FIG. 11, the present disclosure can provide a plurality of positive composite material layers 3 disposed on the first lateral surface 20 of the insulative package body 2 and respectively corresponding to the positive portions P of the capacitors 10, and each positive composite material layer 3 includes a plurality of positive conductive layers 30.

Next, the step S110 includes forming an electrode unit 5 including a first electrode structure 50 and a second electrode structure 51, the first electrode structure 50 covering (or enclosing) a first portion 21 of the insulative package body 2 and electrically contacting the positive composite material layer 3, and the second electrode structure 51 covering (or enclosing) a second portion 22 of the insulative package body 2 and electrically contacting the conductive connection layer 4. For example, referring to FIG. 7 and FIG. 12, after forming the at least one positive composite material layer 3 on the first lateral surface 20 of the insulative package body 2, the electrode unit 5 is formed on the insulative package body 2. More particularly, after forming the at least one positive composite material layer 3 on the first lateral surface 20 of the insulative package body 2, the first electrode structure 50 is formed to cover (or enclose) the first portion 21 of the insulative package body 2 and electrically contact the positive composite material layer 3, and the second electrode structure 51 is formed to cover (or enclose) the second portion 22 of the insulative package body 2 and electrically contact the conductive connection layer 4.

In conclusion, the production efficiency of the capacitor assembly structure Z of the present disclosure shall be increased effectively by matching the features of "the capacitor unit 1 including a plurality of capacitors 10, and each capacitor 10 having a positive portion P and a negative portion N", "the insulative package body 2 partially covering the capacitors 10, and a lateral side P1 of the positive portion P of each capacitor 10 being exposed from a first lateral surface 20 of the insulative package body 2", "the positive composite material layers 3 being respectively electrically connected to the capacitors 10, and each positive composite material layer 3 being disposed on the first lateral surface 20 of the insulative package body 2 and the lateral side P1 of the positive portion P of the corresponding capacitor 10 so as to electrically connect to the positive portion P of the corresponding capacitor 10", "the conductive connection layer 4 being electrically connected to the negative portion N of the capacitor 10", and "the electrode unit 5 including a first electrode structure 50 and a second electrode structure 51, the first electrode structure 50 covering a first portion 21 of the insulative package body 2 and electrically contacting the positive composite material layer 3, and the second electrode structure 51 covering a second portion 22 of the insulative package body 2 and electrically contacting the conductive connection layer 4".

Furthermore, the production efficiency of the capacitor assembly structure Z of the present disclosure shall be increased effectively by matching the features of "providing at least one capacitor 10 having a positive portion P and a negative portion N", "placing the at least one capacitor 10 on a conductive connection layer 4 so as to electrically connect the conductive connection layer 4 with the negative portion N of the at least one capacitor 10", "totally covering the at least one capacitor 10 by an insulative package body 2", "cutting the insulative package body 2 so as to expose a lateral side P1 of the positive portion P of the at least one capacitor 10 from a first lateral surface 20 of the insulative package body 2", "forming at least one positive composite material layer 3 on the first lateral surface 20 of the insulative package body 2 and the lateral side P1 of the positive portion P of the at least one capacitor 10 so as to electrically connect the positive composite material layer 3 to the positive portion P of the at least one capacitor 10", and "forming an electrode unit 5 including a first electrode structure 50 and a second electrode structure 51, the first electrode structure 50 covering a first portion 21 of the insulative package body 2 and electrically contacting the positive composite material layer 3, and the second electrode structure 51 covering a second portion 22 of the insulative package body 2 and electrically contacting the conductive connection layer 4".

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A capacitor assembly structure, comprising:
a capacitor unit including a plurality of capacitors, each capacitor having a positive portion and a negative portion;
an insulative package body partially covering the capacitors, a lateral side of the positive portion of each capacitor being exposed from a first lateral surface of the insulative package body;
a plurality of positive composite material layers respectively electrically connected to the capacitors, each of the positive composite material layers being disposed on the first lateral surface of the insulative package body and the lateral side of the positive portion of the corresponding capacitor so as to electrically connect to the positive portion of the corresponding capacitor;
a conductive connection layer configured for carrying the capacitors, and electrically connected to the negative portion of the capacitor; and
an electrode unit including a first electrode structure and a second electrode structure, the first electrode structure covering a first portion of the insulative package body and electrically contacting the positive composite material layer, and the second electrode structure covering a second portion of the insulative package body and electrically contacting the conductive connection layer;
wherein the insulative package body has a top surface and a bottom surface opposite to the top surface thereof, the conductive connection layer has a top surface and a bottom surface opposite to the top surface thereof, and the capacitors are divided into a plurality of first capacitors and a plurality of second capacitors;
wherein a bottommost one of the first capacitors contacts the top surface of the conductive connection layer, the other first capacitors are separate from the conductive connection layer, and a topmost one of the first capacitors is closer to the top surface of the insulative package body than the conductive connection layer is;
wherein a topmost one of the second capacitors contacts the bottom surface of the conductive connection layer, the other second capacitors are separate from the conductive connection layer, and a bottommost one of the second capacitors is closer to the bottom surface of the insulative package body than the conductive connection layer is;
wherein the first lateral surface of the insulative package body is flush with the lateral side of the positive portion of the capacitor, and the positive composite material layer has a plane contacting the first lateral surface of the insulative package body and the lateral side of the positive portion.

2. The capacitor assembly structure according to claim 1, wherein each of the capacitors includes a metal foil, an oxidation layer fully enclosing the metal foil, a conductive polymer layer enclosing a portion of the oxidation layer, a carbon paste layer fully enclosing the conductive polymer layer, and a silver paste layer fully enclosing the carbon paste layer, and the metal foil has a porous corrosion layer formed on a surface thereof.

3. The capacitor assembly structure according to claim 1, wherein the positive composite material layer includes at least two positive conductive layers, and the positive conductive layer is an Ni layer, an Ag layer, a Cu layer, a Cr layer, an Sn layer, a Zn layer, an Au layer, a Pt layer, a Pd layer or a Ti layer.

4. The capacitor assembly structure according to claim 1, wherein the first electrode structure includes a first inner conductive layer covering the first portion of the insulative package body and electrically connected to the positive composite material layer, a first middle conductive layer covering the first inner conductive layer, and a first outer conductive layer covering the first middle conductive layer; wherein the second electrode structure includes a second inner conductive layer covering the second portion of the insulative package body and electrically connected to the conductive connection layer, a second middle conductive layer covering the second inner conductive layer, and a second outer conductive layer covering the second middle conductive layer; wherein both the first inner conductive layer and the second inner conductive layer are Ag layers, both the first middle conductive layer and the second middle conductive layer are Ni layers, and both the first outer conductive layer and the second outer conductive layer are Sn layers.

5. The capacitor assembly structure according to claim 1, further comprising: a negative composite material layer disposed on a second lateral surface of the insulative package body and a lateral side of the conductive connection layer so as to electrically connect to the negative portion of the capacitor; wherein the negative composite material layer includes at least two negative conductive layers, and the negative conductive layer is an Ni layer, an Ag layer, a Cu layer, a Cr layer, an Sn layer, a Zn layer, an Au layer, a Pt layer, a Pd layer or a Ti layer; wherein the second lateral surface of the insulative package body is flush with the lateral side of the conductive connection layer, and the negative composite material layer has a plane contacting the second lateral surface of the insulative package body and the lateral side of the conductive connection layer.

* * * * *